(12) United States Patent
Sheehan et al.

(10) Patent No.: US 7,771,648 B2
(45) Date of Patent: Aug. 10, 2010

(54) ONE-DIMENSIONAL CONTINUOUS MOLDED ELEMENT

(75) Inventors: Astrid Annette Sheehan, Cincinnati, OH (US); Philip Andrew Sawin, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 109 days.

(21) Appl. No.: 11/398,958

(22) Filed: Apr. 6, 2006

(65) Prior Publication Data

US 2007/0238383 A1    Oct. 11, 2007

(51) Int. Cl.
*B29C 51/10* (2006.01)
(52) U.S. Cl. .................. 264/555; 264/167; 264/168
(58) Field of Classification Search .................. None
See application file for complete search history.

(56) References Cited

U.S. PATENT DOCUMENTS

| | | | |
|---|---|---|---|
| 3,485,706 A | 12/1969 | Evans | |
| 3,786,615 A | 1/1974 | Bauer | |
| 3,800,364 A | 4/1974 | Kalwaites | |
| 3,917,785 A | 11/1975 | Kalwaites | |
| 4,041,951 A * | 8/1977 | Sanford | 604/375 |
| 4,379,799 A | 4/1983 | Holmes et al. | |
| 4,588,457 A | 5/1986 | Crenshaw et al. | |
| 4,665,597 A | 5/1987 | Suzuki et al. | |
| 4,718,152 A | 1/1988 | Suzuki et al. | |
| 4,741,944 A | 5/1988 | Jackson et al. | |
| 4,868,958 A | 9/1989 | Suzuki et al. | |
| 4,981,557 A | 1/1991 | Bjorkquist | |
| 5,043,155 A | 8/1991 | Puchalski et al. | |
| 5,115,544 A | 5/1992 | Widen | |
| 5,143,679 A | 9/1992 | Weber et al. | |
| 5,397,435 A | 3/1995 | Ostendorf et al. | |
| 5,405,501 A | 4/1995 | Phan et al. | |
| 5,518,801 A | 5/1996 | Chappell et al. | |
| 5,628,097 A | 5/1997 | Benson et al. | |
| 5,632,072 A | 5/1997 | Simon et al. | |
| 5,648,083 A | 7/1997 | Blieszner et al. | |
| 5,658,639 A | 8/1997 | Curro et al. | |
| 5,871,763 A | 2/1999 | Luu et al. | |
| 5,888,524 A | 3/1999 | Cole | |
| 5,914,084 A | 6/1999 | Benson et al. | |
| 5,916,661 A | 6/1999 | Benson et al. | |
| 6,083,854 A | 7/2000 | Bogdanski et al. | |
| 6,114,263 A | 9/2000 | Benson et al. | |
| 6,129,801 A | 10/2000 | Benson et al. | |
| 6,207,596 B1 | 3/2001 | Rourke et al. | |
| 6,300,301 B1 | 10/2001 | Moore et al. | |
| 6,361,784 B1 | 3/2002 | Brennan et al. | |
| 6,383,431 B1 | 5/2002 | Dobrin et al. | |
| 6,440,437 B1 | 8/2002 | Krzysik et al. | |

(Continued)

OTHER PUBLICATIONS

PCT Search Report, mailed Apr. 9, 2007, 4 pages.

*Primary Examiner*—Monica A Huson
(74) *Attorney, Agent, or Firm*—Amy M. Foust; Richard L. Alexander; Dara M. Kendall

(57) ABSTRACT

A molded fibrous structure comprising a continuous molded element. The continuous molded element may be one-dimensional. A method for making a molded fibrous structure comprising a continuous molded element. A substrate for use as a wipe made from a molded fibrous structure.

12 Claims, 9 Drawing Sheets

U.S. PATENT DOCUMENTS

| | | |
|---|---|---|
| 2002/0007540 A1 | 1/2002 | Black et al. |
| 2003/0028165 A1 | 2/2003 | Curro et al. |
| 2004/0131820 A1 | 7/2004 | Turner et al. |
| 2004/0154768 A1 | 8/2004 | Trokhan et al. |
| 2004/0157524 A1 | 8/2004 | Polat et al. |
| 2004/0265534 A1 | 12/2004 | Curro et al. |

* cited by examiner

ONE-DIMENSIONAL CONTINUOUS MOLDED ELEMENT

FIELD OF THE INVENTION

A process for preparing a one-dimensional, continuous, molded nonwoven fibrous structure and substrates made therefrom are provided. One-dimensional, continuous, molded nonwoven fibrous structures prepared by the inventive process and apparatus are also provided.

BACKGROUND OF THE INVENTION

Historically, various types of nonwoven fibrous structures have been utilized as disposable substrates. The various types of nonwovens used may differ in visual and tactile properties, usually due to the particular production processes used in their manufacture. In all cases, however, consumers of disposable substrates suitable for use as wipes, such as baby wipes, demand strength, thickness, flexibility, texture and softness in addition to other functional attributes such as cleaning ability. Strength, thickness and flexibility can be correlated to certain measurable physical parameters, but perceived softness and texture are often more subjective in nature, and consumers often react to visual and tactile properties in their assessment of wipes. Optimizing all the desirable properties is often not possible.

For example, often a balance of properties results in less than desirable softness or strength levels. Wipes used as baby wipes, for example, should be strong enough when wet to maintain integrity in use, but soft enough to give a pleasing and comfortable tactile sensation to the user(s). They should have fluid retention properties such that they remain wet during storage, and sufficient thickness, porosity, and texture to be effective in cleaning the soiled skin of a user. In addition, sufficient thickness and texture should be retained when wet.

Strength in a nonwoven fibrous structure can be generated by a variety of known methods. If thermoplastic fibers are used, strength can be imparted by melting, either by through-air bonding or by hot roll calendaring. Adhesive bonding is also commonly used to bind fibers to increase the strength of the nonwoven. However, these processes, while increasing the strength of the nonwoven, generally detract from other desirable properties, such as softness and flexibility. Hydroentangling a fibrous structure may generate nonwovens with high softness and flexibility but may reduce the strength of the material. Such a reduction in strength is undesirable for many applications of nonwoven fibrous structures, such as in a wipe application. Due to the nature of cleansing tasks for which wipes are used, consumers prefer a wipe that has a high amount of apparent bulk and strength associated with it. To increase the basis weight of the starting material, such that after hydroentangling the material retains sufficient strength to be used as a baby wipe, would be prohibitively expensive.

The strength, thickness, flexibility and perceived softness may also be affected by any hydro-molding (also known as hydro-embossing, hydraulic needle-punching, etc.) of the nonwoven fibrous structure during manufacture. Hydro-molding is a known means of introducing texture and/or design to the nonwoven structures. As noted above, substrate texture may provide product differentiation, strength, softness and cleaning efficacy. Various images and graphics may be hydro-molded onto the nonwoven fibrous structure. The images and graphics may be a single image or graphic, a group of images or graphics, a repeating pattern of images or graphics, a continuous image or graphic and combinations thereof. It has been discovered, however, that the hydro-molding of images or graphics onto the nonwoven fibrous structure may detract from the desired strength of the fibrous structure.

During manufacture of the fibrous structure, the fibers generally orient in the Machine Direction when laid on a forming member. Such fiber-orientation is common to various formation technologies such as, but not limited to, carding, air-laying, spunbonding, etc. The fibrous web may then be conveyed over a molding member, such as a drum, belt, etc. that may comprise a molding pattern of raised areas, lowered areas, or combinations thereof interspersed thereon. The pattern may be used to mold the image, graphic or texture onto the fibrous web thereby creating a molded fibrous structure. The resulting image, graphic, or texture on the fibrous structure may be a molded element of the fibrous structure.

In a typical manufacturing process where the molding pattern is meant to consist of discrete or dis-joined elements of a repeating pattern, each element would be represented on the molding member as a complementary discrete element. Additionally, where the molding pattern is meant to incorporate at least one continuous element extending across the width or along the length of the non-woven, the molding member must be constructed so that the lowered areas of the molding pattern are continuous along either the length or the width of the fibrous structure.

In a manufacturing process for textures incorporating a continuous molding pattern, the continuous pattern may optionally be oriented in either the Machine Direction (i.e. parallel to the dominant fiber-orientation direction) or in the Cross Direction (i.e. perpendicular to the dominant fiber-orientation). It has been found that hydro-molding a continuous molding pattern onto a fibrous structure, in which the lowered areas on the molding member are oriented in the Machine Direction, may produce a molded element on a fibrous structure that is weak in strength because there are fewer fibers oriented in the Cross Direction to provide continuity and, as such, strength across the molded element. A lack of strength can result in a molded fibrous structure that may easily rip and fall apart.

Thus, there is a need to maintain the strength of a fibrous structure incorporating a continuous molded element. There remains a need to provide a substrate from a molded fibrous structure.

SUMMARY OF THE INVENTION

The present invention relates to a method for making a molded fibrous structure comprising a continuous molded element. The method comprises the steps of conveying a fibrous web along a machine direction over a molding member. The molding member comprises a pattern of raised areas, lowered areas or combinations thereof. Fluid is directed to impact the fibrous web causing the fibrous web to conform to the pattern on the molding member. The conformed fibrous web is also known as the molded fibrous structure. At least a portion of the pattern is oriented in a non-Machine Direction.

At least a portion of the pattern is oriented from about 85 degrees to about −85 degrees from the Cross Direction. In an alternate embodiment, at least a portion of the pattern is oriented from about 45 degrees to about −45 degrees from the Cross Direction.

The pattern may comprise a width. The width of the pattern may be from about 0.03 cm to about 4.5 cm.

The continuous molded element may be one-dimensional.

The fluid may impact the fibrous web in a continuous flow or in a non-continuous flow.

The fibrous structure may further be converted into a substrate.

The present invention also relates to a molded fibrous structure comprising a continuous molded element made according to the steps of conveying a fibrous web along a machine direction over a molding member and directing fluid to impact the fibrous web. The molding member comprises a pattern of raised areas, lowered areas or combinations thereof. The fluid causes the fibrous web to conform to the pattern resulting in a molded fibrous structure. At least a portion of the pattern is oriented in a non-Machine Direction. A portion of the pattern may be oriented from about 85 degrees to about −85 degrees from the Cross Direction.

A substrate may comprise a molded fibrous structure further comprising a one-dimensional continuous molded element.

DETAILED DESCRIPTION OF THE INVENTION

Figure 1:
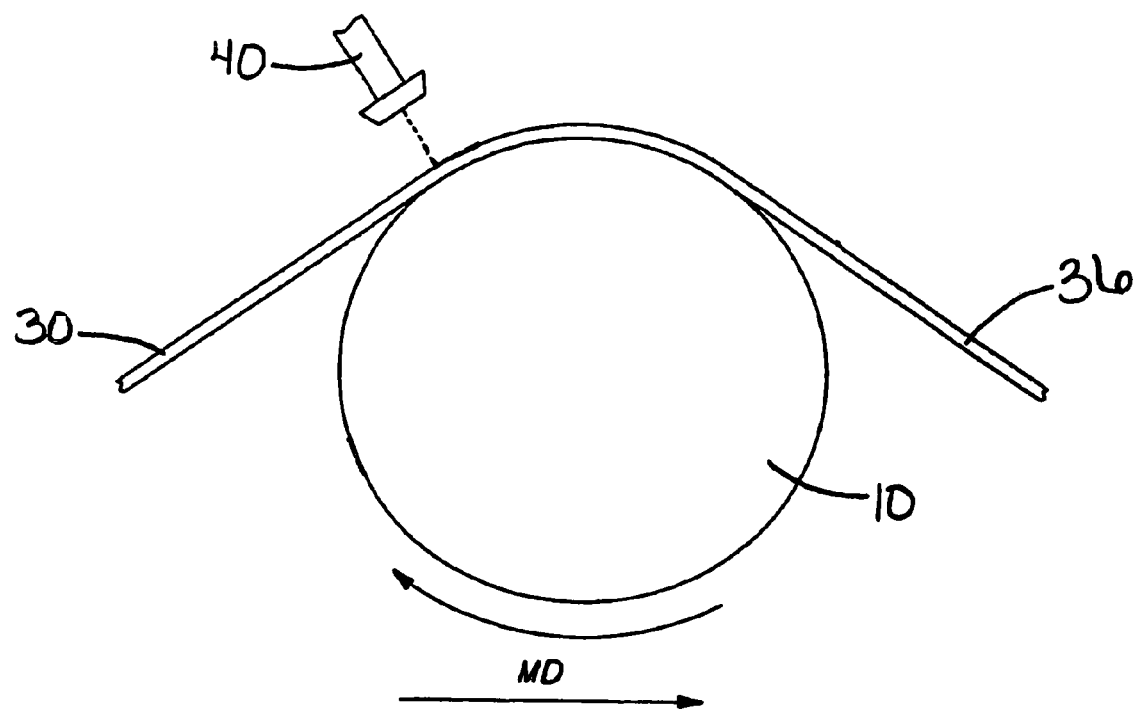
FIG. 1 is a side view of one embodiment of a molding member of the present invention.

"Air-laying" refers herein to a process whereby air is used to separate, move, and randomly deposit fibers from a forming head to form a coherent, and largely isotropic fibrous web. Air laying equipment and processes are known in the art, and include Kroyer or Dan Web devices (suitable for wood pulp air laying, for example) and Rando webber devices (suitable for staple fiber air laying, for example).

"Basis Weight" refers herein to the weight (measured in grams) of a unit area (typically measured in square meters) of the fibrous structure, which unit area is taken in the plane of the fibrous structure. The size and shape of the unit area from which the basis weight is measured is dependent upon the relative and absolute sizes and shapes of the regions having different basis weights.

"Carding" refers herein to a mechanical process whereby clumps of fibers are substantially separated into individual fibers and simultaneously made into a coherent fibrous web. Carding is typically carried out on a machine that utilizes opposed moving beds or surfaces of fine, angled, closely spaced teeth or wires or their equivalent to pull and tease the clumps apart. The teeth of the two opposing surfaces typically are inclined in opposite directions and move at different speeds relative to each other.

"Co-forming" refers herein to include a spun-melt process, in which particulate matter, typically cellulose-pulp, is entrained in the quenching air, so that the particulate matter becomes bound to the semi-molten fibers during the fiber formation process.

"Continuous Molded Element" refers herein to a texture, pattern, image, graphic and combinations thereof on a molded fibrous structure that has been imparted by hydro-molding. The hydro-molded texture, pattern, image, graphic and combinations thereof may extend, without interruption, from a first edge of the molded fibrous structure to a second edge of the molded fibrous structure. The continuous molded element, however, does not have to extend between exact opposite locations of a first edge and a second edge of a substrate formed from a molded fibrous structure.

"Cross Direction" refers herein to a direction that is perpendicular to the Machine Direction. This direction is carefully distinguished herein because the mechanical properties of fibrous structures can differ, depending on how the fibrous structure is oriented. For purposes herein, the Cross Direction is noted as having an angle of zero degrees in the X-Direction of an XY grid. All angles will be noted from the reference point of the Cross Direction.

"Fibrous Structure" refers herein to an arrangement comprising a plurality of synthetic fibers, natural fibers, and combinations thereof. The synthetic and/or natural fibers may be layered, as known in the art, to form the fibrous structure. The fibrous structure may be a nonwoven. The fibrous structure may be formed from a fibrous web and may be a precursor to a substrate.

"gsm" refers herein to "grams per square meter."

"Machine Direction" refers herein to the direction in which a continuous fibrous structure is manufactured. Generally, fiber laying processes such as carding, spunbonding, melt-blowing, etc., may result in fiber-orientation parallel to the Machine Direction. This direction is carefully distinguished herein because the mechanical properties of fibrous structures can differ, depending on how the fibrous structure is oriented. For purposes herein, the Machine Direction is noted as having an angle of ninety degrees from the Cross Direction.

"Molding Member" refers to a structural element that can be used as a support for a fibrous web comprising a plurality of natural fibers, a plurality of synthetic fibers, and combinations thereof. The molding member may "mold" a desired geometry to the fibrous structure. The molding member may comprise a molding pattern that may have the ability to impart the pattern onto a fibrous web being conveyed thereon to produce a molded fibrous structure comprising a continuous molded element.

"Nonwoven" refers to a fibrous structure made from an assembly of continuous fibers, co-extruded fibers, non-continuous fibers and combinations thereof, without weaving or knitting, by processes such as spunbonding, carding, melt-blowing, air-laying, wet-laying, co-form, or other such processes known in the art for such purposes. The nonwoven structure may comprise one or more layers of such fibrous assemblies, wherein each layer may include continuous fibers, co-extruded fibers, non-continuous fibers and combinations thereof.

"One-dimensional Continuous Molded Element" refers herein to a continuous molded element oriented primarily in the Machine Direction or the Cross Direction. A continuous molded element is one-dimensional such that it does not intersect another continuous molded element.

"Spun-melt" refers herein to processes including both spun-laying and melt-blowing. Spun-laying is a process whereby fibers are extruded from a melt during the making of the coherent web. The fibers are formed by the extrusion of molten fiber material through fine capillary dies, and quenched, typically in air, prior to laying. In melt-blowing, the air-flow used during quenching is typically greater than in spun-laying, and the resulting fibers are typically finer, due to the drawing-influence of the increased air-flow.

"Substrate" refers herein to a piece of material, generally non-woven material, used in cleaning or treating various surfaces, such as food, hard surfaces, inanimate objects, body parts, etc. For example, many currently available substrates may be intended for the cleansing of the peri-anal area after defecation. Other substrates may be available for the cleansing of the face or other body parts. A "substrate" may also be known as a "wipe" and both terms may be used interchangeably. Multiple substrates may be attached together by any suitable method to form a mitt.

Fibrous Web

The fibrous web can be formed in any conventional fashion and may be any nonwoven web which is suitable for use in a hydromolding process. The fibrous web may consist of any web, mat, or batt of loose fibers, disposed in relationship with one another in some degree of alignment, such as might be produced by carding, air-laying, spunbonding, and the like. The fibrous web may be a precursor to a nonwoven molded fibrous structure.

The fibers of the fibrous web, and subsequently the nonwoven molded fibrous structure, may be any natural, cellulosic, and/or wholly synthetic material. Examples of natural fibers may include cellulosic natural fibers, such as fibers from hardwood sources, softwood sources, or other non-wood plants. The natural fibers may comprise cellulose, starch and combinations thereof. Non-limiting examples of suitable cellulosic natural fibers include, but are not limited to, wood pulp, typical northern softwood Kraft, typical southern softwood Kraft, typical CTMP, typical deinked, corn pulp, acacia, eucalyptus, aspen, reed pulp, birch, maple, radiata pine and combinations thereof Other sources of natural fibers from plants include, but are not limited to, albardine, esparto, wheat, rice, corn, sugar cane, papyrus, jute, reed, sabia, raphia, bamboo, sidal, kenaf, abaca, sunn, rayon (also known as viscose), lyocell, cotton, hemp, flax, ramie and combinations thereof. Yet other natural fibers may include fibers from other natural non-plant sources, such as, down, feathers, silk, cotton and combinations thereof. The natural fibers may be treated or otherwise modified mechanically or chemically to provide desired characteristics or may be in a form that is generally similar to the form in which they can be found in nature. Mechanical and/or chemical manipulation of natural fibers does not exclude them from what are considered natural fibers with respect to the development described herein.

The synthetic fibers can be any material, such as, but not limited to, those selected from the group consisting of polyesters (e.g., polyethylene terephthalate), polyolefins, polypropylenes, polyethylenes, polyethers, polyamides, polyesteramides, polyvinylalcohols, polyhydroxyalkanoates, polysaccharides, and combinations thereof. Further, the synthetic fibers can be a single component (i.e., single synthetic material or mixture makes up entire fiber), bi-component (i.e., the fiber is divided into regions, the regions including two or more different synthetic materials or mixtures thereof and may include co-extruded fibers and core and sheath fibers) and combinations thereof. It is also possible to use bicomponent fibers. These bicomponent fibers can be used as a component fiber of the structure, and/or they may be present to act as a binder for the other fibers present in the fibrous structure. Any or all of the synthetic fibers may be treated before, during, or after the process of the present invention to change any desired properties of the fibers. For example, in certain embodiments, it may be desirable to treat the synthetic fibers before or during processing to make them more hydrophilic, more wettable, etc.

In certain embodiments of the present invention, it may be desirable to have particular combinations of fibers to provide desired characteristics. For example, it may be desirable to have fibers of certain lengths, widths, coarseness or other characteristics combined in certain layers or separate from each other. The fibers may be of virtually any size and may have an average length from about 1 mm to about 60 mm. Average fiber length refers to the length of the individual fibers if straightened out. The fibers may have an average fiber width of greater than about 5 micrometers. The fibers may have an average fiber width of from about 5 micrometers to about 50 micrometers. The fibers may have a coarseness of greater than about 5 mg/100 m. The fibers may have a coarseness of from about 5 mg/100 m to about 75 mg/100 m.

The fibers may be circular in cross-section, dog bone shaped, delta (i.e., triangular cross-section), tri-lobal, ribbon, or other shapes typically produced as staple fibers. Likewise, the fibers can be conjugate fibers, such as bicomponent fibers. The fibers may be crimped, and may have a finish, such as a lubricant, applied.

The fibrous web of the present invention may have a basis weight of between about 30, 40 or 45 gsm and about 50, 55, 60, 65, 70, or 75 gsm. Fibrous webs for use in the present invention may be available from the J.W. Suominen Company of Finland, and sold under the FIBRELLA trade name. For example, FIBRELLA 3100 and FIBRELLA 3160 have been found to be useful as fibrous webs in the present invention. FIBRELLA 3100 is a 62 gsm nonwoven web comprising 50% 1.5 denier polypropylene fibers and 50% 1.5 denier viscose fibers. FIBRELLA 3160 is a 58 gsm nonwoven web comprising 60% 1.5 denier polypropylene fibers and 40% 1.5 denier viscose fibers. In both of these commercially available fibrous webs, the average fiber length is about 38 mm. Additional fibrous webs available from Suominen may include a 62 gsm nonwoven web comprising 60% polypropylene fibers and 40% viscose fibers; a fibrous web comprising a basis weight from about 50 or 55 to about 58 or 62 and comprising 60% polypropylene fibers and 40% viscose fibers; and a fibrous web comprising a basis weight from about 62 to about 70 or 75 gsm. The latter fibrous web may comprise 60% polypropylene fibers and 40% viscose fibers.

Molded Fibrous Structure

The fibrous web may be the precursor to a fibrous structure. The fibrous web may be conveyed over a molding member during or after manufacture. The molding member may comprise a molding pattern of raised areas, lowered areas, and combinations thereof interspersed thereon. Raised areas may also incorporate solid areas. Lowered areas may also incorporate void areas. The molding member may impart the pattern onto the fibrous web during a hydro-molding process step thereby forming a fibrous structure comprising a molded element.

The molding pattern of raised and/or lowered areas may comprise images, graphics and combinations thereof and may comprise logos, indicia, trademarks, geometric patterns, images of the surfaces that a substrate (as discussed herein) is intended to clean (i.e., infant's body, face, etc.) and combinations thereof. They may be utilized in a random or alternating manner or they may be used in a consecutive, repeating manner. The images, graphics and combinations thereof may be a single image or graphic, a group of images or graphics, a repeating pattern of images or graphics, a continuous image or graphic, and combinations thereof.

The molded fibrous structure may comprise a continuous molded element. The continuous molded element may extend from a first edge of the fibrous structure to a second edge of the fibrous structure and thereby form a continuous molded element. The continuous molded element may extend from a first location on a first edge of the fibrous structure to an exact opposing second location on a second edge of the fibrous structure. Alternatively, the continuous molded element may extend from a first location on a first edge of the fibrous structure to a second location on a second edge of the fibrous structure wherein the second location is not an exact opposite location from the originating location.

At least a portion of the continuous molded element on the fibrous structure may be oriented in a non-Machine Direction. The molded element need not be oriented solely at a position of zero degrees relative to the Cross Direction. The molded element may comprise portions molded in the Machine Direction and portions molded in the Cross Direction. The continuous molded element may be oriented at various angles on the fibrous structure. The angle orientation of the continuous molded element may be measured from the Cross Direction comprising an angle of zero degrees. The continuous molded element may be oriented on the fibrous structure at an angle of about 15, 30, 45, 60, 75 or 85 degrees. Alternatively, the continuous molded element may be oriented on the fibrous structure at an angle of about −15, −30, −45, −60, −75, −85 degrees. The continuous molded element may be oriented on the fibrous structure at any angle from about 85 degrees to about −85 degrees. The continuous molded element may be oriented on the fibrous structure at any angle from about 75, 60, 45, 30, or 15 degrees to about −15, −30, −45, −60, or −75 degrees.

The continuous molded element may comprise a width. The width of the continuous molded element may be any desired width, provided that the width of the continuous molded element is not so great as to cause the continuous molded element to contact another continuous molded element. The width of the continuous molded element may be measured from the top edge of the continuous molded element to the bottom edge of the continuous molded element. The width may be greater than about 0.03 cm. The width may be less than about 4.5 cm. The width of the continuous molded element may range from about 0.03, 0.05, 0.1, 0.3, 0.5, 1 or 1.5 cm to about 2, 2.5, 3, 3.5, 4, or 4.5 cm. Unmolded areas may exist between each continuous molded element so as to provide separation between each continuous molded element.

The fibrous structure of the present invention may take a number of different forms. The fibrous structure may comprise 100% synthetic fibers or may be a combination of synthetic fibers and natural fibers. In one embodiment of the present invention, the fibrous structure may include one or more layers of a plurality of synthetic fibers mixed with a plurality of natural fibers. The synthetic fiber/natural fiber mix may be relatively homogeneous in that the different fibers may be dispersed generally randomly throughout the layer. The fiber mix may be structured such that the synthetic fibers and natural fibers may be disposed generally non-randomly. In one embodiment, the fibrous structure may include at least one layer comprising a plurality of natural fibers and at least one adjacent layer comprising a plurality of synthetic fibers. In another embodiment, the fibrous structure may include at least one layer that comprises a plurality of synthetic fibers homogeneously mixed with a plurality of natural fibers and at least one adjacent layer that comprises a plurality of natural fibers. In an alternate embodiment, the fibrous structure may include at least one layer that comprises a plurality of natural fibers and at least one adjacent layer that may comprise a mixture of a plurality of synthetic fibers and a plurality of natural fibers in which the synthetic fibers and/or natural fibers may be disposed generally non-randomly. Further, one or more of the layers of mixed natural fibers and synthetic fibers may be subjected to manipulation during or after the formation of the fibrous structure to disperse the layer or layers of mixed synthetic and natural fibers in a predetermined pattern or other non-random pattern.

The fibrous structure may further comprise binder materials. The fibrous structure may comprise from about 0.01% to about 1%, 3%, or 5% by weight of a binder material selected from the group consisting of permanent wet strength resins, temporary wet strength resins, dry strength resins, retention aid resins and combinations thereof.

If permanent wet strength is desired, the binder materials may be selected from the group consisting of polyamide-epichlorohydrin, polyacrylamides, styrene-butadiene latexes, insolubilized polyvinyl alcohol, ureaformaldehyde, polyethyleneimine, chitosan polymers and combinations thereof.

If temporary wet strength is desired, the binder materials may be starch based. Starch based temporary wet strength resins may be selected from the group consisting of cationic dialdehyde starch-based resin, dialdehyde starch and combinations thereof. The resin described in U.S. Pat. No. 4,981,557, issued Jan. 1, 1991 to Bjorkquist may also be used.

If dry strength is desired, the binder materials may be selected from the group consisting of polyacrylamide, starch, polyvinyl alcohol, guar or locust bean gums, polyacrylate latexes, carboxymethyl cellulose and combinations thereof.

A latex binder may also be utilized. Such a latex binder may have a glass transition temperature from about 0° C., −10° C., or −20° C. to about −40° C., −60° C., or −80° C. Examples of latex binders that may be used include polymers and copolymers of acrylate esters, referred to generally as acrylic polymers, vinyl acetate-ethylene copolymers, styrene-butadiene copolymers, vinyl chloride polymers, vinylidene chloride polymers, vinyl chloride-vinylidene chloride copolymers, acrylo-nitrile copolymers, acrylic-ethylene copolymers and combinations thereof. The water emulsions of these latex binders usually contain surfactants. These surfactants may be modified during drying and curing so that they become incapable of rewetting.

Methods of application of the binder materials may include aqueous emulsion, wet end addition, spraying and printing. At least an effective amount of binder may be applied to the fibrous structure. Between about 0.01% and about 1.0%, 3.0% or 5.0% may be retained on the fibrous structure, calculated on a dry fiber weight basis. The binder may be applied to the fibrous structure in an intermittent pattern generally covering less than about 50% of the surface area of the structure. The binder may also be applied to the fibrous structure in a pattern to generally cover greater than about 50% of the fibrous structure. The binder material may be disposed on the fibrous structure in a random distribution. Alternatively, the binder material may be disposed on the fibrous structure in a non-random repeating pattern.

Additional information relating to the fibrous structure may be found in U.S. Patent Application No. 2004/0154768, filed by Trokhan et al. and published Aug. 12, 2004, US Patent Application No. 2004/0157524, filed by Polat et al. and published Aug. 12, 2004, U.S. Pat. No. 4,588,457, issued to Crenshaw et al., May 13, 1986, U.S. Pat. No. 5,397,435, issued to Ostendorf et al., Mar. 14, 1995 and U.S. Pat. No. 5,405,501, issued to Phan et al., Apr. 11, 1995.

Substrate

The molded fibrous structure, as described above, may be utilized to form a substrate. The molded fibrous structure may continue to be processed in any method known to one of ordinary skill to convert the molded fibrous structure to a substrate comprising at least one continuous molded element. This may include, but is not limited to, slitting, cutting, perforating, folding, stacking, interleaving, lotioning and combinations thereof. The substrate may comprise a continuous molded element extending from a first location on a first edge to a second location on a second edge. The second location may be exactly opposite to the first location or may be at a position on the second edge such that the second location is not exactly opposite from the first location. In one embodiment, the second location may be on the same substrate as the first location or may be on a subsequent substrate that does not also comprise the first location. Variations in molding and processing may produce a substrate in which the continuous molded element that, while extending in a non-Machine Direction, does not extend from a location on one edge to a mirror image location on another edge. As noted above, the pattern on the molding member may be oriented at an angle as measured from the Cross Direction. Thus, the continuous molded element may be oriented at an angle between 85° and −85° relative to the Cross Direction on the substrate.

The material of which a substrate is made from should be strong enough to resist tearing during manufacture and normal use, yet still provide softness to the user's skin, such as a child's tender skin. Additionally, the material should be at least capable of retaining its form for the duration of the user's cleansing experience.

Substrates may be generally of sufficient dimension to allow for convenient handling. Typically, the substrate may be cut and/or folded to such dimensions as part of the manufacturing process. In some instances, the substrate may be cut into individual portions so as to provide separate wipes which are often stacked and interleaved in consumer packaging. In other embodiments, the substrates may be in a web form where the web has been slit and folded to a predetermined width and provided with means (e.g., perforations) to allow individual wipes to be separated from the web by a user. Suitably, the separate wipes may have a length between about 100 mm and about 250 mm and a width between about 140 mm and about 250 mm. In one embodiment, the separate wipe may be about 200 mm long and about 180 mm wide.

The material of the substrate may generally be soft and flexible, potentially having a structured surface to enhance its performance. It is also within the scope of the present invention that the substrate may include laminates of two or more materials. Commercially available laminates, or purposely built laminates would be within the scope of the present invention. The laminated materials may be joined or bonded together in any suitable fashion, such as, but not limited to, ultrasonic bonding, adhesive, glue, fusion bonding, heat bonding, thermal bonding, hydroentangling and combinations thereof. In another alternative embodiment of the present invention the substrate may be a laminate comprising one or more layers of nonwoven materials and one or more layers of film. Examples of such optional films, include, but are not limited to, polyolefin films, such as, polyethylene film. An illustrative, but non-limiting example of a nonwoven sheet member which is a laminate of a 16 gsm nonwoven polypropylene and a 0.8 mm 20 gsm polyethylene film.

The substrate materials may also be treated to improve the softness and texture thereof. The substrate may be subjected to various treatments, such as, but not limited to, physical treatment, such as ring rolling, as described in U.S. Pat. No. 5,143,679; structural elongation, as described in U.S. Pat. No. 5,518,801; consolidation, as described in U.S. Pat. Nos. 5,914,084, 6,114,263, 6,129,801 and 6,383,431; stretch aperturing, as described in U.S. Pat. Nos. 5,628,097, 5,658,639 and 5,916,661; differential elongation, as described in WO Publication No. 2003/0028165A1; and other solid state formation technologies as described in U.S. Publication No. 2004/0131820A1 and U.S. Publication No. 2004/0265534A1, zone activation, and the like; chemical treatment, such as, but not limited to, rendering part or all of the substrate hydrophobic, and/or hydrophilic, and the like; thermal treatment, such as, but not limited to, softening of fibers by heating, thermal bonding and the like; and combinations thereof.

The substrate may have a basis weight of at least about 30 grams/m$^2$. The substrate may have a basis weight of at least about 40 grams/m$^2$. In one embodiment, the substrate may have a basis weight of at least about 45 grams/m$^2$. In another embodiment, the substrate basis weight may be less than about 75 grams/m$^2$. In another embodiment, substrates may have a basis weight between about 40 grams/m$^2$ and about 75 grams/m$^2$, and in yet another embodiment a basis weight between about 40 grams/m$^2$ and about 65 grams/m$^2$. The substrate may have a basis weight between about 30, 40, or 45 and about 50, 55, 60, 65, 70 or 75 grams/m$^2$.

A suitable substrate may be a carded nonwoven comprising a 40/60 blend of viscose fibers and polypropylene fibers having a basis weight of 58 grams/m$^2$ as available from Suominen of Tampere, Finland as FIBRELLA 3160. Another suitable material for use as a substrate may be SAWATEX 2642 as available from Sandler AG of Schwarzenbach/Salle, Germany. Yet another suitable material for use as a substrate may have a basis weight of from about 50 grams/m$^2$ to about 60 grams/m$^2$ and have a 20/80 blend of viscose fibers and polypropylene fibers. The substrate may also be a 60/40 blend of pulp and viscose fibers. The substrate may also be formed from any of the following fibrous webs such as those available from the J.W. Suominen Company of Finland, and sold under the FIBRELLA trade name. For example, FIBRELLA 3100 is a 62 gsm nonwoven web comprising 50% 1.5 denier polypropylene fibers and 50% 1.5 denier viscose fibers. In both of these commercially available fibrous webs, the average fiber length is about 38 mm. Additional fibrous webs available from Suominen may include a 62 gsm nonwoven web comprising 60% polypropylene fibers and 40% viscose fibers; a fibrous web comprising a basis weight from about 50 or 55 to about 58 or 62 and comprising 60% polypropylene fibers and 40% viscose fibers; and a fibrous web comprising a basis weight from about 62 to about 70 or 75 gsm. The latter fibrous web may comprise 60% polypropylene fibers and 40% viscose fibers.

In one embodiment of the present invention the surface of substrate may be essentially flat. In another embodiment of the present invention the surface of the substrate may optionally contain raised and/or lowered portions. These can be in the form of logos, indicia, trademarks, geometric patterns, images of the surfaces that the substrate is intended to clean (i.e., infant's body, face, etc.). They may be randomly arranged on the surface of the substrate or be in a repetitive pattern of some form.

In another embodiment of the present invention the substrate may be biodegradable. For example, the substrate could be made from a biodegradable material such as a polyesteramide, or a high wet strength cellulose.

Composition

The substrate may further comprise a soothing and/or cleansing composition. The composition impregnating the substrate is commonly and interchangeably called lotion, soothing lotion, soothing composition, oil-in-water emulsion composition, emulsion composition, emulsion, cleaning or cleansing lotion or composition. All those terms are hereby used interchangeably. The composition may generally comprise the following optional ingredients: emollients, surfactants and/or an emulsifiers, soothing agents, rheology modifiers, preservatives, or more specifically a combination of preservative compounds acting together as a preservative system and water.

It is to be noted that some compounds can have a multiple function and that all compounds are not necessarily present in the composition of the invention. The composition may be a oil-in-water emulsion. The pH of the composition may be from about pH 3, 4 or 5 to about pH 7, 7.5, or 9.

Emollient:

In the substrates of the present invention, emollients may (1) improve the glide of the substrate on the skin, by enhancing the lubrication and thus decreasing the abrasion of the skin, (2) hydrate the residues (for example, fecal residues or dried urine residues), thus enhancing their removal from the skin, (3) hydrate the skin, thus reducing its dryness and irritation while improving its flexibility under the wiping movement, and (4) protect the skin from later irritation (for example, caused by the friction of underwear) as the emollient is deposited onto the skin and remains at its surface as a thin protective layer.

In one embodiment, emollients may be silicone based. Silicone-based emollients may be organo-silicone based polymers with repeating siloxane (Si—O) units. Silicone-based emollients of the present invention may be hydrophobic and may exist in a wide range of possible molecular weights. They may include linear, cyclic and cross-linked varieties. Silicone oils may be chemically inert and may have a high flash point. Due to their low surface tension, silicone oils may be easily spreadable and may have high surface activity. Examples of silicon oil may include: cyclomethicones, dimethicones, phenyl-modified silicones, alkyl-modified silicones, silicones resins and combinations thereof.

Other useful emollients can be unsaturated esters or fatty esters. Examples of unsaturated esters or fatty esters of the present invention include: caprylic capric triglycerides in combination with Bis-PEG/PPG-16/16 PEG/PPG-16/16 dimethicone and $C_{12}$-$C_{15}$ alkylbenzoate and combinations thereof.

A relatively low surface tension may act more efficiently in the composition. Surface tension lower than about 35 mN/m, or even lower than about 25 mN/m. In certain embodiments, the emollient may have a medium to low polarity. Also, the emollient of the present invention may have a solubility parameter between about 5 and about 12, or even between about 5 and about 9. The basic reference of the evaluation of surface tension, polarity, viscosity and spreadability of emollient can be found under Dietz, T., Basic properties of cosmetic oils and their relevance to emulsion preparations. SOFW-Journal, July 1999, pages 1-7.

Emulsifier/Surfactant:

The composition may also include an emulsifier such as those forming oil-in-water emulsions. The emulsifier can be a mixture of chemical compounds and include surfactants. The preferred emulsifiers are those acting as well as a surfactant. For the purpose of this document, the terms emulsifiers and surfactants are thereafter used interchangeably. The emulsifier may be a polymeric emulsifier or a non polymeric one.

The emulsifier may be employed in an amount effective to emulsify the emollient and/or any other non-water-soluble oils that may be present in the composition, such as an amount ranging from about 0.5%, 1%, or 4% to about 0.001%, 0.01%, or 0.02% (based on the weight emulsifiers over the weight of the composition). Mixtures of emulsifiers may be used.

Emulsifiers for use in the present invention may be selected from the group consisting of alkylpolylglucosides, decylpolyglucoside, fatty alcohol or alkoxylated fatty alcohol phosphate esters (e.g., trilaureth-4 phosphate), sodium trideceth-3 carboxylate, or a mixture of caprylic capric triglyceride and Bis-PEG/PPG-16/16 PEG/PPG-16/16 dimethicone, polysorbate 20, and combinations thereof.

Rheology Modifier

Rheology modifiers are compounds that increase the viscosity of the composition at lower temperatures as well as at process temperatures. Each of these materials may also provide "structure" to the compositions to prevent settling out (separation) of insoluble and partially soluble components. Other components or additives of the compositions may affect the temperature viscosity/rheology of the compositions.

In addition to stabilizing the suspension of insoluble and partially soluble components, the rheology modifiers of the invention may also help to stabilize the composition on the substrate and enhance the transfer of lotion to the skin. The wiping movement may increase the shear and pressure therefore decreasing the viscosity of the lotion and enabling a better transfer to the skin as well as a better lubrication effect.

Additionally, the rheology modifier may help to preserve a homogeneous distribution of the composition within a stack of substrates. Any composition that is in fluid form has a tendency to migrate to the lower part of the wipes stack during prolonged storage. This effect creates an upper zone of the stack having less composition than the bottom part. This is seen as a sign of relatively low quality by the users.

Preferred rheology modifiers may exhibit low initial viscosity and high yield. Particularly suited are rheology modifiers such as, but not limited to:

Blends of material as are available from Uniqema GmbH&Co. KG, of Emmerich, Germany under the trade name ARLATONE. For instance, ARLATONE V-175 which is a blend of sucrose palmitate, glyceryl stearate, glyceryl stearate citrate, sucrose, mannan, and xanthan gum and Arlatone V-100 which is a blend of steareth-100, steareth-2, glyceryl stearate citrate, sucrose, mannan and xanthan gum.

Blends of materials as are available from Seppic France of Paris, France as SIMULGEL. For example, SIMULGEL NS which comprises a blend of hydroxyethylacrylate/sodium acryloyldimethyl taurate copolymer and squalane and polysorbate 60, sodium acrylate/sodium acryloyldimethyltaurate copolymer and polyisobutene and caprylyl capryl glucoside, acrylate copolymers, such as but not limited to acrylates/acrylamide copolymers, mineral oil, and polysorbate 85.

Acrylate homopolymers, acrylate crosspolymers, such as but not limited to, Acrylate/C10-30 Alkyl Acrylate crosspolymers, carbomers, such as but not limited to acrylic acid cross linked with one or more allyl ether, such as but not limited to allyl ethers of pentaerythritol, allyl ethers of sucrose, allyl ethers of propylene, and combinations thereof as are available are available as the Carbopol® 900 series from Noveon, Inc. of Cleveland, Ohio (e.g., Carbopol® 954).

Naturally occurring polymers such as xanthan gum, galactoarabinan and other polysaccharides.

Combinations of the above rheology modifiers.

Examples, of commercially available rheology modifiers include but are not limited to, Ultrez-10, a carbomer, and Pemulen TR-2, an acrylate crosspolymers, both of which are available from Noveon, Cleveland Ohio, and Keltrol, a xanthan gum, available from CP Kelco San Diego Calif.

Rheology modifiers imparting a low viscosity may be used. Low viscosity is understood to mean viscosity of less than about 10,000 cps at about 25 degrees Celsius of a 1% aqueous solution. The viscosity may be less than about 5,000 cps under the same conditions. Further, the viscosity may be less than about 2000 cps or even less than about 1,000 cps. Other characteristics of emulsifiers may include high polarity and a non-ionic nature.

Rheology modifiers, when present may be used in the present invention at a weight/weight % (w/w) from about 0.01%, 0.015%, or 0.02% to about 1%, 2%, or 3%.

Preservative

The need to control microbiological growth in personal care products is known to be particularly acute in water based products such as oil-in-water emulsions and in pre-impregnated substrates such as baby wipes. The composition may comprise a preservative or more preferably a combination of preservatives acting together as a preservative system. Preservatives and preservative systems are used interchangeably in the present document to indicate one unique or a combination of preservative compounds. A preservative is understood to be a chemical or natural compound or a combination of compounds reducing the growth of microorganisms, thus enabling a longer shelf life for the pack of wipes (opened or not opened) as well as creating an environment with reduced growth of microorganisms when transferred to the skin during the wiping process.

Preservatives of the present invention can be defined by 2 key characteristics: (i) activity against a large spectrum of microorganisms, that may include bacteria and/or molds and/or yeast, preferably all three categories of microorganisms together and (2) killing efficacy and/or the efficacy to reduce the growth rate at a concentration as low as possible.

The spectrum of activity of the preservative of the present invention may include bacteria, molds and yeast. Ideally, each of such microorganisms are killed by the preservative. Another mode of action to be contemplated is the reduction of the growth rate of the microorganisms without active killing. Both actions however result in a drastic reduction of the population of microorganisms.

Suitable materials include, but are not limited to a methylol compound, or its equivalent, an iodopropynyl compound and mixtures thereof. Methylol compounds release a low level of formaldehyde when in water solution that has effective preservative activity. Exemplary methylol compounds include but are not limited to: diazolidinyl urea (GERMALL® II as is available from International Specialty Products of Wayne, N.J.) N-[1,3-bis(hydroxy-methyl)-2,5-dioxo-4-imidazolidinyl]-N,N'-bis(hydroxymethyl) urea, imidurea (GERMALL® 115 as is available from International Specialty Products of Wayne, N.J.), 1,1-methylene bis[3-[3-(hydroxymethyl)-2,5-dioxo-4-imidazolidinyl]urea]; 1,3-dimethylol-5,5-dimethyl hydantoin (DMDMH), sodium hydroxymethyl glycinate (SUTTOCIDE® A as is available from International Specialty Products of Wayne, N.J.), and glycine anhydride dimethylol (GADM). Methylol compounds can be effectively used at concentrations (100% active basis) between about 0.025% and about 0.50%. A preferred concentration (100% basis) is about 0.075%. The iodopropynyl compound provides antifungal activity. An exemplary material is iodopropynyl butyl carbamate as is available from Clariant UK, Ltd. of Leeds, The United Kingdom as NIPACIDE IPBC. A particularly preferred material is 3-iodo-2-propynylbutylcarbamate. Iodopropynyl compounds can be used effectively at a concentration between about 0% and about 0.05%. A preferred concentration is about 0.009%. A particularly preferred preservative system of this type comprise a blend of a methylol compound at a concentration of about 0.075% and a iodopropynyl compound at a concentration of about 0.009%.

In another embodiment, the preservative system may comprise simple aromatic alcohols (e.g., benzyl alcohol). Materials of this type have effective anti bacterial activity. Benzyl alcohol is available from Synrise, Inc. of Teterboro, N.J.

In another embodiment, the preservative may be a paraben antimicrobial selected from the group consisting of methylparaben, ethylparaben, propylparaben, butylparaben, isobutylparaben or combinations thereof.

Chelators (e.g., ethylenediamine tetraacetic acid and its salts) may also be used in preservative systems as a potentiator for other preservative ingredients.

The preservative composition can moreover provide a broad anti-microbial effect without the use of formaldehyde donor derived products. These traditional formaldehyde based preservative products have been widely used in the past but are now no longer permitted in a number of countries for products intended for human use.

Optional Components of the Composition:

The composition may optionally include adjunct ingredients. Possible adjunct ingredients may be selected from a wide range of additional ingredients such as, but not limited to soothing agents, perfumes and fragrances, texturizers, colorants, medically active ingredients, in particular healing actives and skin protectants.

Optional soothing agents may be (a) ethoxylated surface active compounds, more preferably those having an ethoxylation number below about 60, (b) polymers, more preferably polyvinylpyrrolidone (PVP) and/or N-vinylcaprolactam homopolymer (PVC), and (c) phospholipids, more preferably phospholipids complexed with other functional ingredients as e.g., fatty acids, organosilicones.

The soothing agents may be selected from the group comprising PEG-40 hydrogenated castor oil, sorbitan isostearate, isoceteth-20, sorbeth-30, sorbitan monooleate, coceth-7, PPG-1-PEG-9 lauryl glycol ether, PEG-45 palm kernel glycerides, PEG-20 almond glycerides, PEG-7 hydrogenated castor oil, PEG-50 hydrogenated castor oil, PEG-30 castor oil, PEG-24 hydrogenated lanolin, PEG-20 hydrogenated lanolin, PEG-6 caprylic/capric glycerides, PPG-1 PEG-9 lauryl glycol ether, lauryl glucoside polyglyceryl-2 dipolyhydroxystearate, sodium glutamate, polyvinylpyrrolidone, N-vinylcaprolactam homopolymer, sodium coco PG-dimonium chloride phosphate, linoleamidopropyl PG-dimonium chloride phosphate, dodium borageamidopropyl PG-dimonium chloride phosphate, N-linoleamidopropyl PG-dimonium chloride phosphate dimethicone, cocamidopropyl PG-dimonium chloride phosphate, stearamidopropyl PG-dimonium chloride phosphate and stearamidopropyl PG-dimonium chloride phosphate (and) cetyl alcohol, and combinations thereof. A particularly preferred soothing agent is PEG-40 hydrogenated castor oil as is available from BASF of Ludwigshafen, Germany as Cremophor CO 40.

Method of Making Molded Fibrous Structure

Generally, the process of the present invention for making a fibrous structure may be described in terms of initially forming a fibrous web having a plurality of synthetic fibers. A plurality of natural fibers may also be disposed in the fibrous web. Layered deposition of the fibers, synthetic and natural, is also contemplated by the present invention. The fibrous web can be formed in any conventional fashion and may be any nonwoven web that may be suitable for use in a hydromolding process. The fibrous web may consist of any web, mat, or batt of loose fibers disposed in any relationship with one another in any degree of alignment, such as might be produced by carding, air-laying, spunmelting (including meltblowing and spunlaying), coforming and the like.

In the present invention, conducting the carding, spunmelting, spunlaying, meltblowing, coforming, or air-laying or other bonding processes concurrently with the fibers contacting a forming member may produce a fibrous web. The process of the present invention may involve subjecting the fibrous web to a hydroentanglement process while the fibrous web is in contact with the forming member. The hydroentanglement process (also known as spunlacing or spunbonding) is a known process of producing nonwoven webs, and involves laying down a matrix of fibers, for example as a carded web or an air-laid web, and entangling the fibers to form a coherent web. Entangling is typically accomplished by impinging the matrix of fibers with high pressure liquid (typically water) from at least one, at least two, or a plurality of suitably-placed water jets. The pressure of the liquid jets, as well as the orifice size and the energy imparted to the fibrous structure preform by the water jets, may be the same as those of a conventional hydroentangling process. Typically, entanglement energy may be about 0.1 kwh/kg. While other fluids can be used as the impinging medium, such as compressed air, water is the preferred medium. The fibers of the web are thus entangled, but not physically bonded one to another. The fibers of a hydroentangled web, therefore, have more freedom of movement than fibers of webs formed by thermal or chemical bonding. Particularly when lubricated by wetting as a pre-moistened wet wipe, such spunlaced webs provide webs having very low bending torques and low moduli, thereby achieving softness and suppleness.

Additional information on hydroentanglement can be found in U.S. Pat. No. 3,485,706 issued on Dec. 23, 1969, to Evans; U.S. Pat. No. 3,800,364 issued on Apr. 2, 1974, to Kalwaites; U.S. Pat. No. 3,917,785 issued on Nov. 4, 1975, to Kalwaites; U.S. Pat. No. 4,379,799 issued on Apr. 12, 1983, to Holmes; U.S. Pat. No. 4,665,597 issued on May 19, 1987, to Suzuki; U.S. Pat. No. 4,718,152 issued on Jan. 12, 1988, to Suzuki; U.S. Pat. No. 4,868,958 issued on Sep. 26, 1989, to Suzuki; U.S. Pat. No. 5,115,544 issued on May 26, 1992, to Widen; and U.S. Pat. No. 6,361,784 issued on Mar. 26 2002, to Brennan.

After the fibrous web has been formed, it can be subjected to additional process steps, such as, hydro-molding (also known as molding, hydro-embossing, hydraulic needle-punching, etc.). FIG. 1 illustrates a side view of a molding member 10 with a fibrous web 30 being conveyed over the top of the molding member 10. A single jet 40, or multiple jets, may be utilized. Water or any other appropriate fluid medium may be ejected from the jet 40 to impact the fibrous web 30. The fluid may impact the fibrous web in a continuous flow or non-continuous flow. The molding member 10 may comprise a molding pattern (as exemplified in FIG. 2). The molding pattern may comprise raised areas, lowered areas, and combinations thereof. As the fluid from the jet(s) 40 impacts the fibrous web 30, the fibrous web 30 may conform to the molding pattern. The fluid may "push" portions of the fibrous web 30 into lowered areas of the pattern. The result may be a molded fibrous structure 36.

Figure 2:
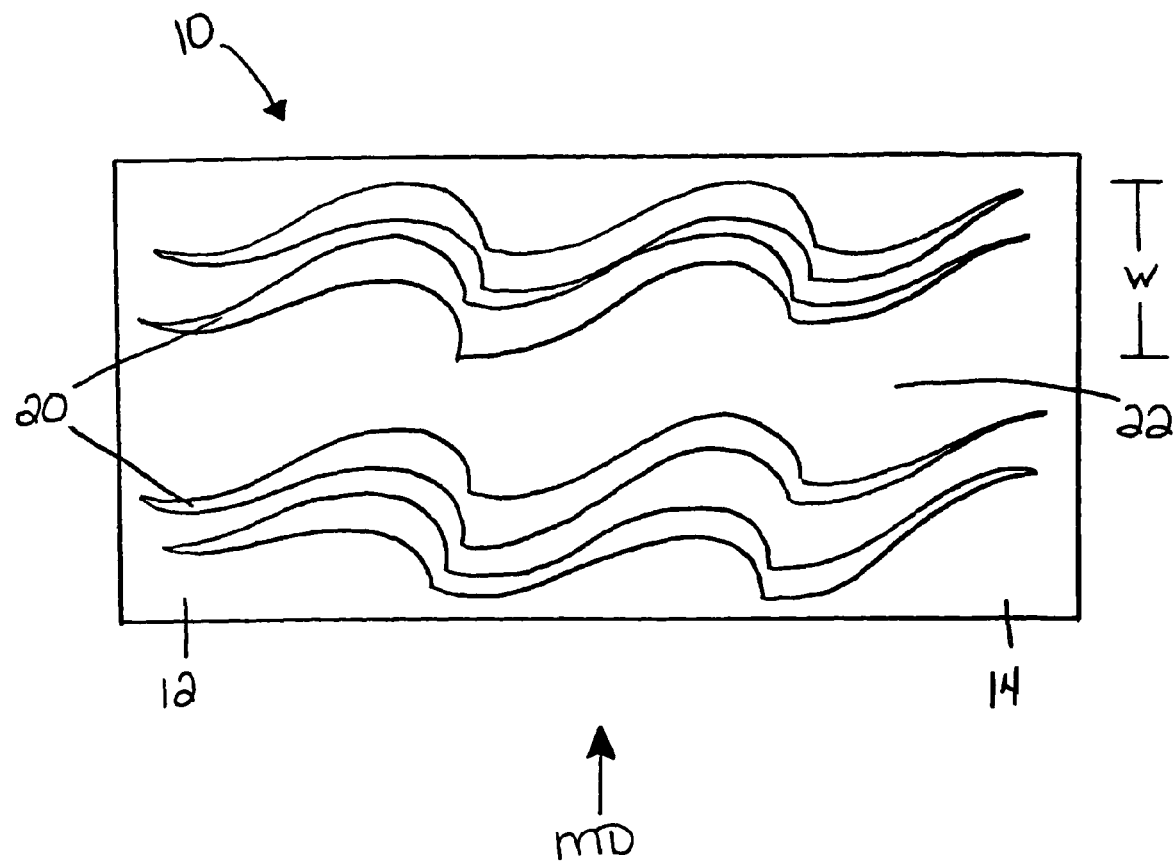
FIG. 2 is a top view of one embodiment of a molding member of the present invention.

FIG. 2 illustrates a molding member 10 comprising an exemplary molding pattern 20 extending in a non-Machine Direction. It should be noted that the pattern may take any form, design, shape, image, graphic, and combinations thereof as desired. The molding member 10 may comprise a pattern 20 of raised areas, lowered areas, and combinations thereof. Raised areas may also incorporate solid areas. Lowered areas may also incorporate void areas. The pattern 20 may extend from a first side 12 to a second side 14 of the molding member 10. The pattern 20 may have a width "w" as deemed appropriate for molding onto a fibrous structure. The width of the pattern 20 may range from about 0.03, 0.05, 0.1, 0.3, 0.5, 1 or 1.5 cm to about 2, 2.5, 3, 3.5, 4, or 4.5 cm. Unmolded space 22 may exist between each pattern 20 so as to provide separation between each pattern 20.

FIG. 2 illustrates that the pattern 20 may be oriented at an angle of about zero degrees. Such a pattern 20 may be considered to be in the Cross Direction. However, it should be realized that the pattern 20 need not be in the Cross Direction. At least a portion of the pattern may be oriented in a non-Machine Direction. While the pattern may have a portion oriented in the Machine Direction, the orientation of the pattern should not be such that the pattern will intersect any other pattern. The pattern 20 may orient at an angle of about 15, 30, 45, 60, 75 or 85 degrees. Alternatively, the pattern 20 may orient at an angle of about −15, −30, −45, −60, −75 or −85 degrees. The pattern 20 may be oriented at any angle from about 85 degrees to about −85 degrees. The pattern 20 may be oriented at any angle from about 75, 60, 45, 30 or 15 degrees to about −15, −30, −45, −60, or −75 degrees. The angle orientation of the pattern is measured from the Cross Direction comprising an angle of zero degrees.

Figure 3:
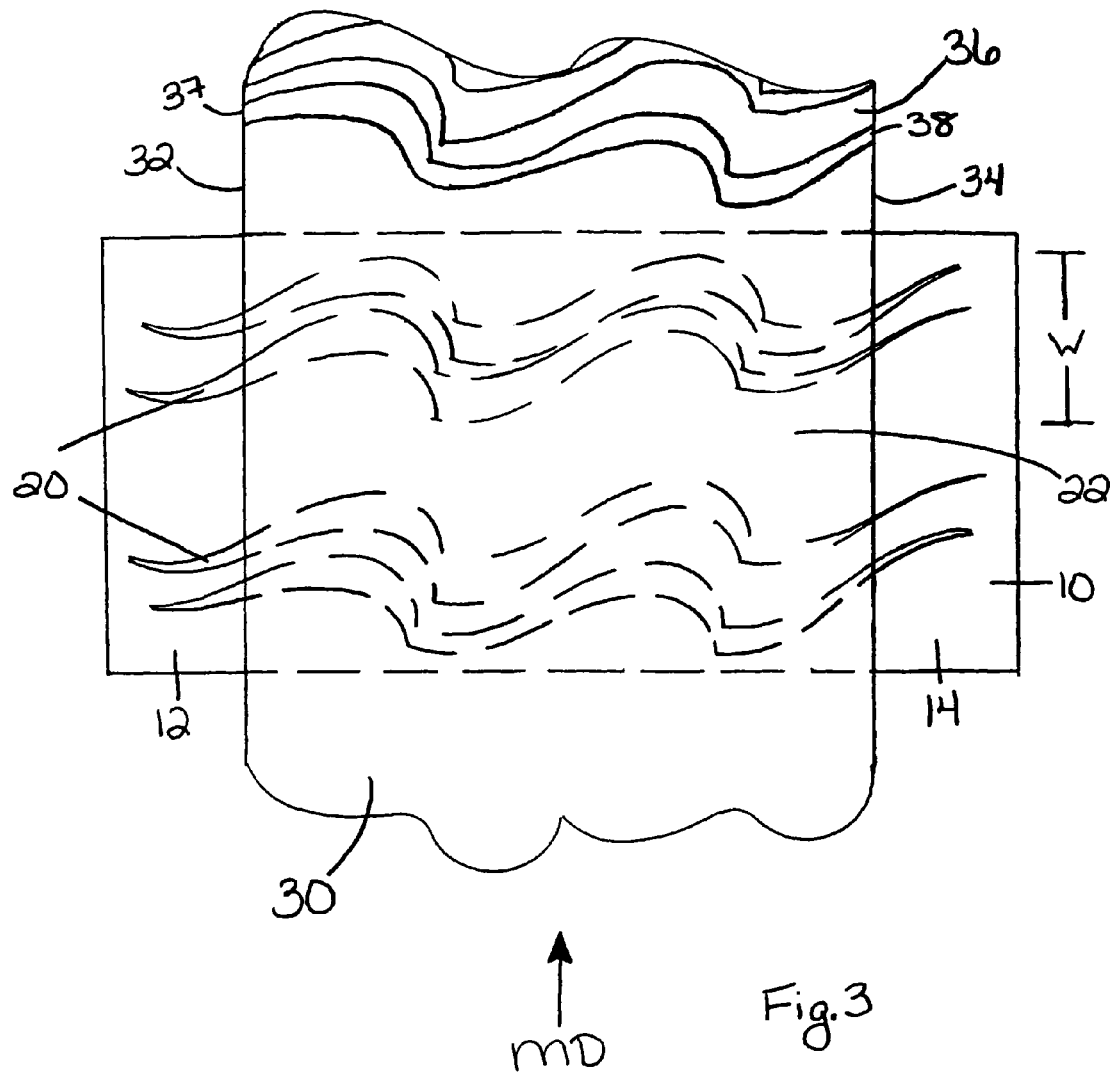
FIG. 3 is a top view of one embodiment of a molding member of the present invention shown with a fibrous web conveyed over the top of the molding member.

FIG. 3 illustrates a top view of a molding member 10 with a fibrous web 30 conveyed over the top of the molding member 10. As the pattern is hydro-molded onto the fibrous web 30, the pattern 20 may extend from a first location 37 of a first edge 32 to a second location 38 of a second edge 34 of the resulting molded fibrous structure 36. As such, the pattern 20 may be considered to be continuous. The pattern 20 may be molded onto the fibrous web 30 by a hydromolding process. In such a process, fluid may be directed towards the fibrous web 30 in such as manner as to impact the fibrous web 30 causing it to conform to the pattern 20 on the molding member 10.

Figure 4:
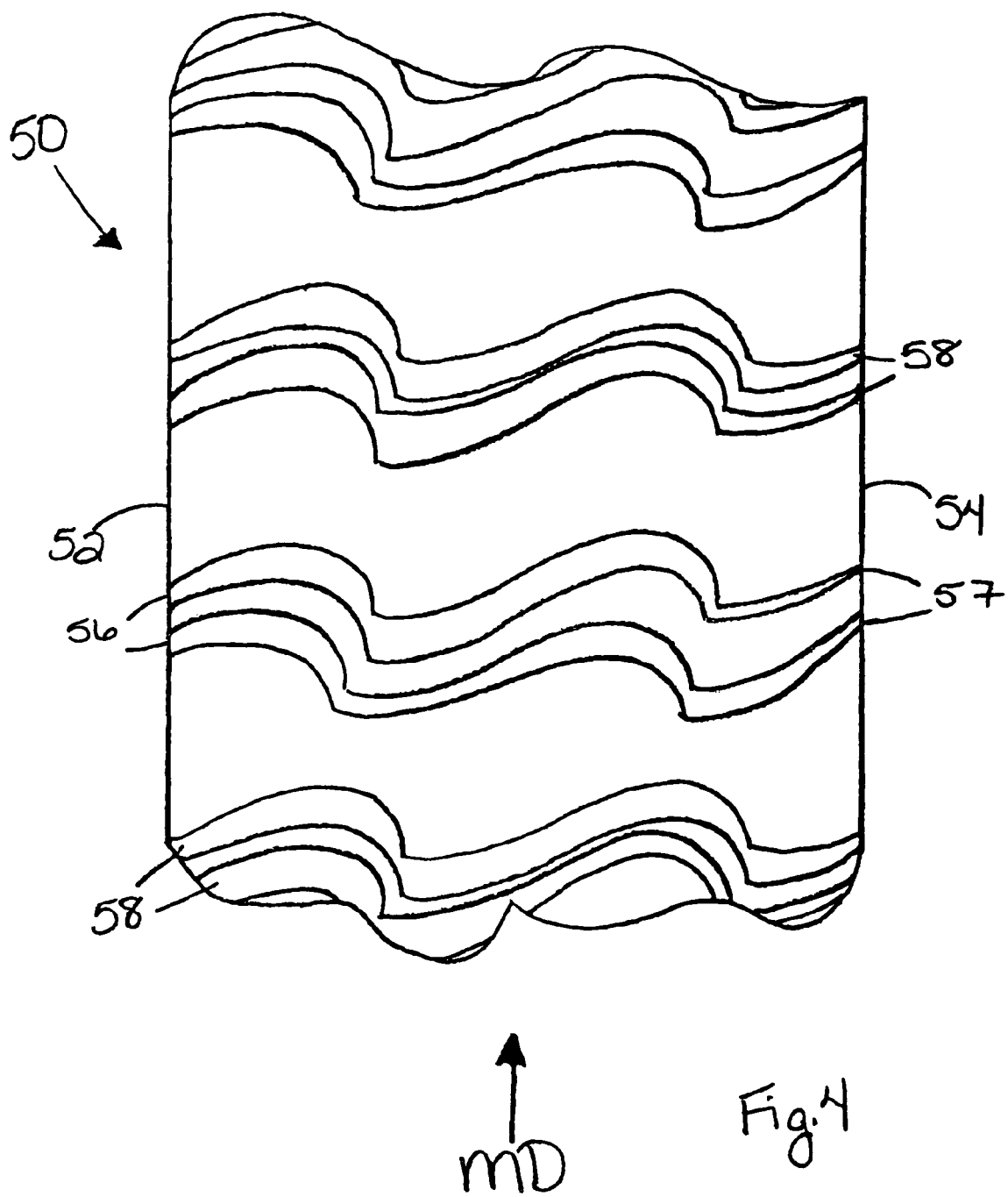
FIG. 4 is a top view of a molded fibrous structure of the present invention in which the continuous molded element extends from one edge of the molded fibrous structure to the exact opposite edge of the molded fibrous structure.

FIG. 4 illustrates a molded fibrous structure 50 comprising a one-dimensional continuous molded element 58 produced by a molding pattern on a molding member. The one-dimensional continuous molded element 58 extends from a first location 56 on a first edge 52 to a second location 57 on a second edge 54. In FIG. 4, the continuous molded element 58 extends to exact opposite locations, 56 and 57, in the Cross Direction of the first and second edges, 52 and 54, respectively.

Figure 5:
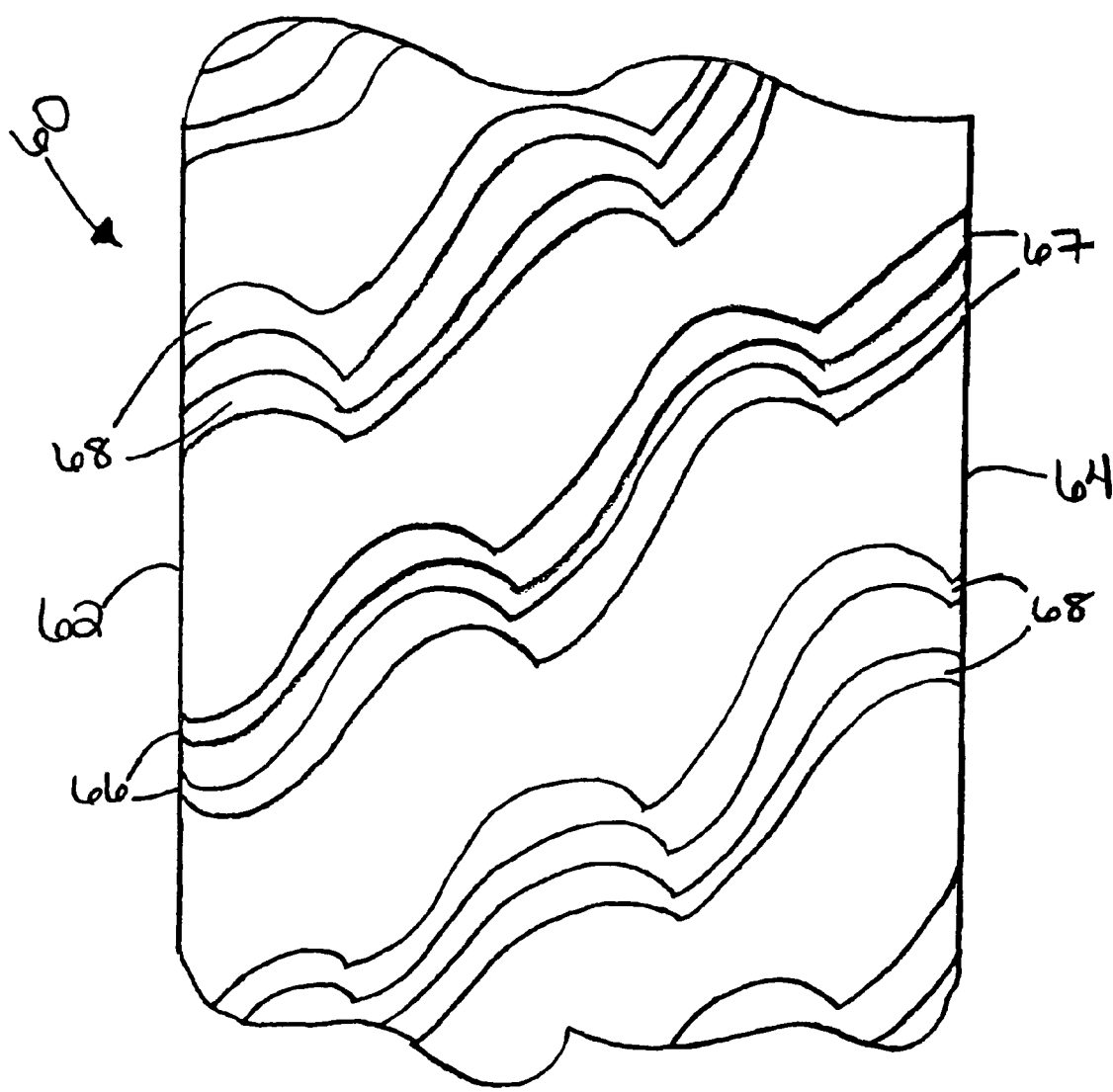
FIG. 5 is a top view of a molded fibrous structure of the present invention in which the continuous molded element extends from one edge of the molded fibrous structure to the other edge of the molded fibrous structure at an angle from the Cross Direction.

FIG. 5 illustrates a molded fibrous structure 60 comprising a one-dimensional continuous molded element 68 produced by a molding pattern on a molding member. The one-dimensional continuous molded element 68 extends from a first location 66 on a first edge 62 to a second location 67 on a second edge 64. In FIG. 5, at least a portion of the continuous molded element 68 extends in a non-Machine Direction. The continuous molded element 68 is illustrated extending at an angle from the Cross Direction and therefore does not extend to exact opposite locations, 66 and 67, on the first and second edges, 62 and 64, respectively.

Following the hydromolding of the pattern onto the fibrous web, the resulting molded fibrous structure may continue to be processed in any method known to one of ordinary skill to covert the molded fibrous structure to a substrate suitable for use as a wipe. This may include, but is not limited to, slitting, cutting, perforating, folding, stacking, interleaving, lotioning and combinations thereof.

Figure 6:
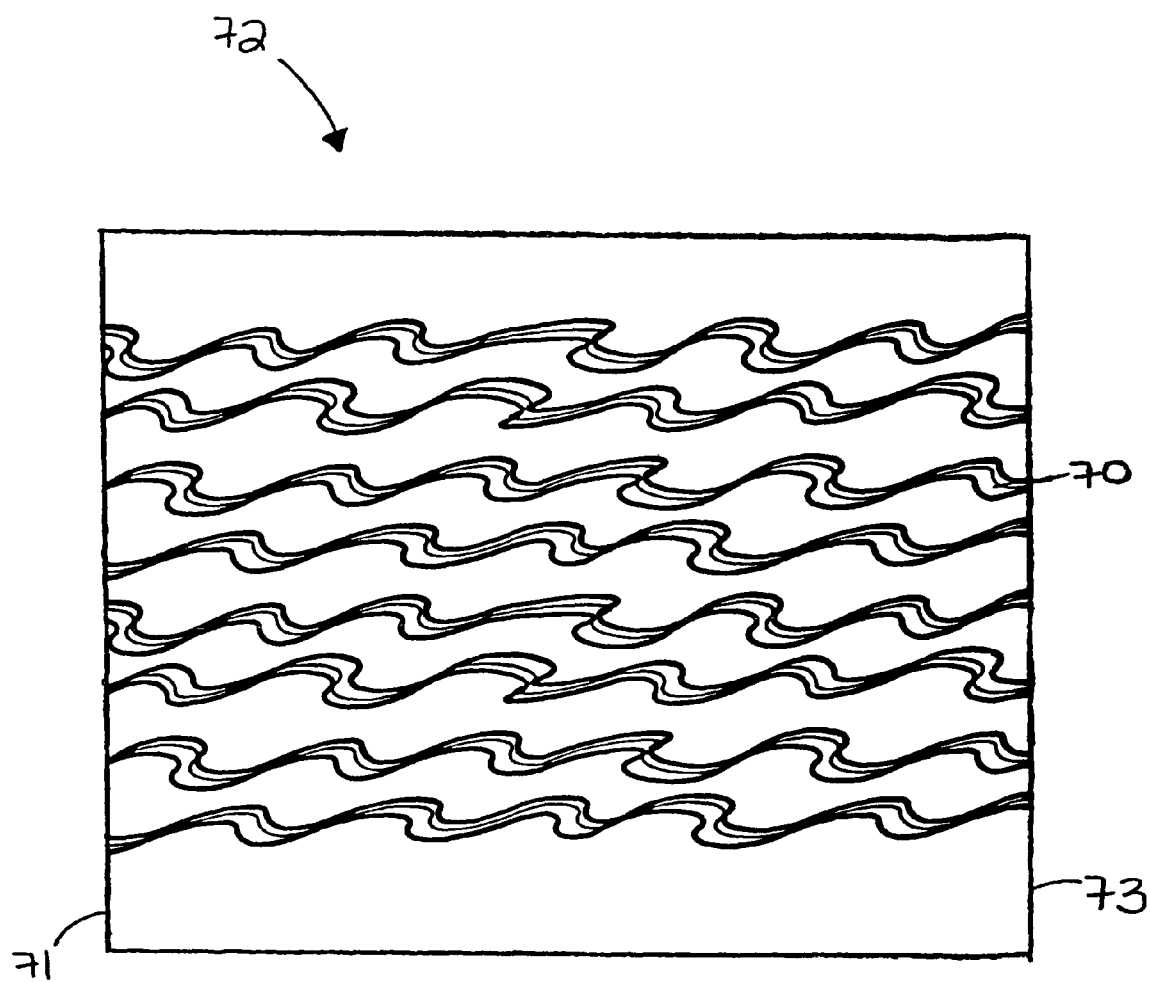
FIG. 6 is a plan view of an exemplary substrate made according to the process of the present invention.
Figure 7:
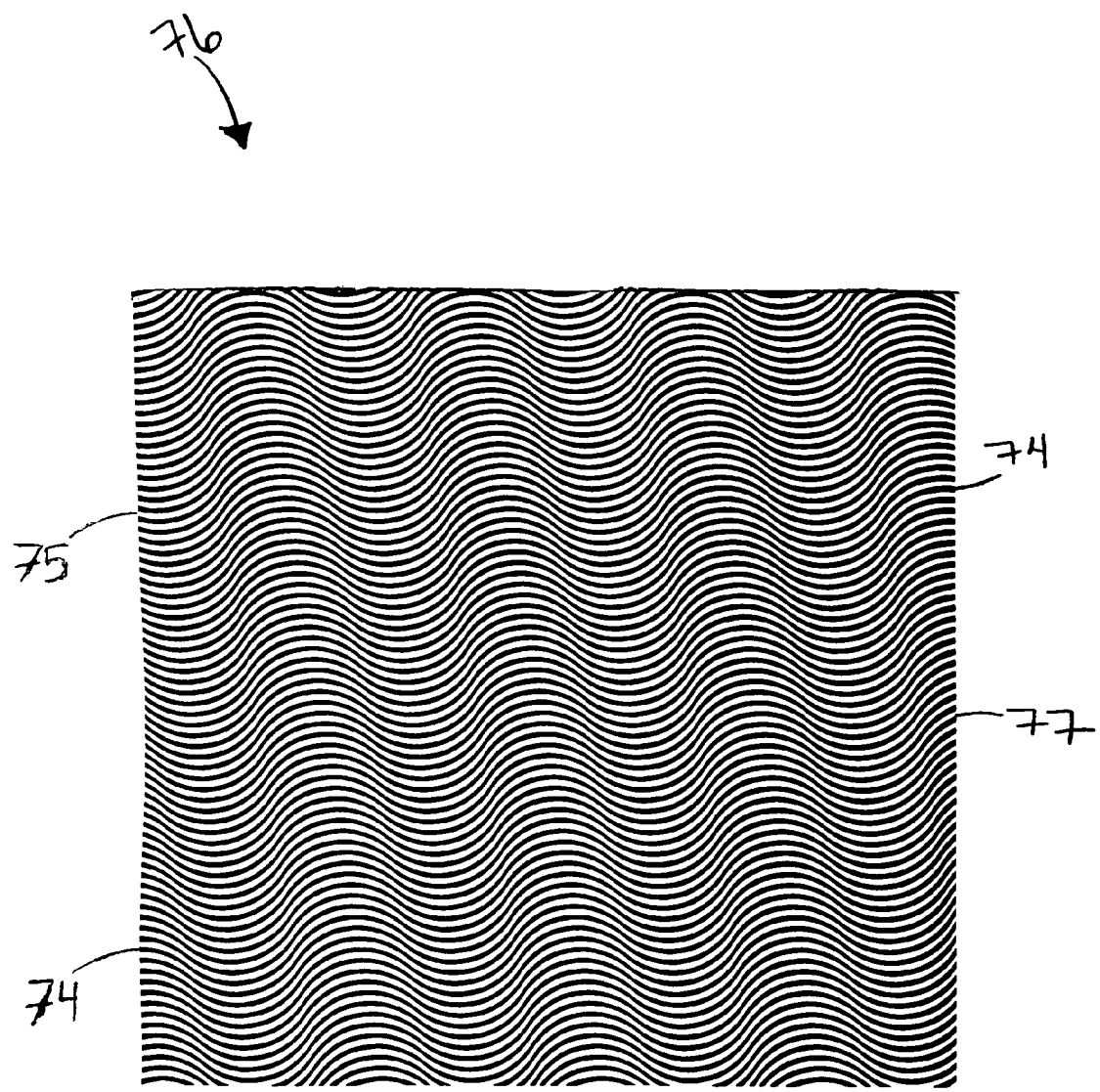
FIG. 7 is a plan view of an exemplary substrate made according to the process of the present invention.
Figure 8:
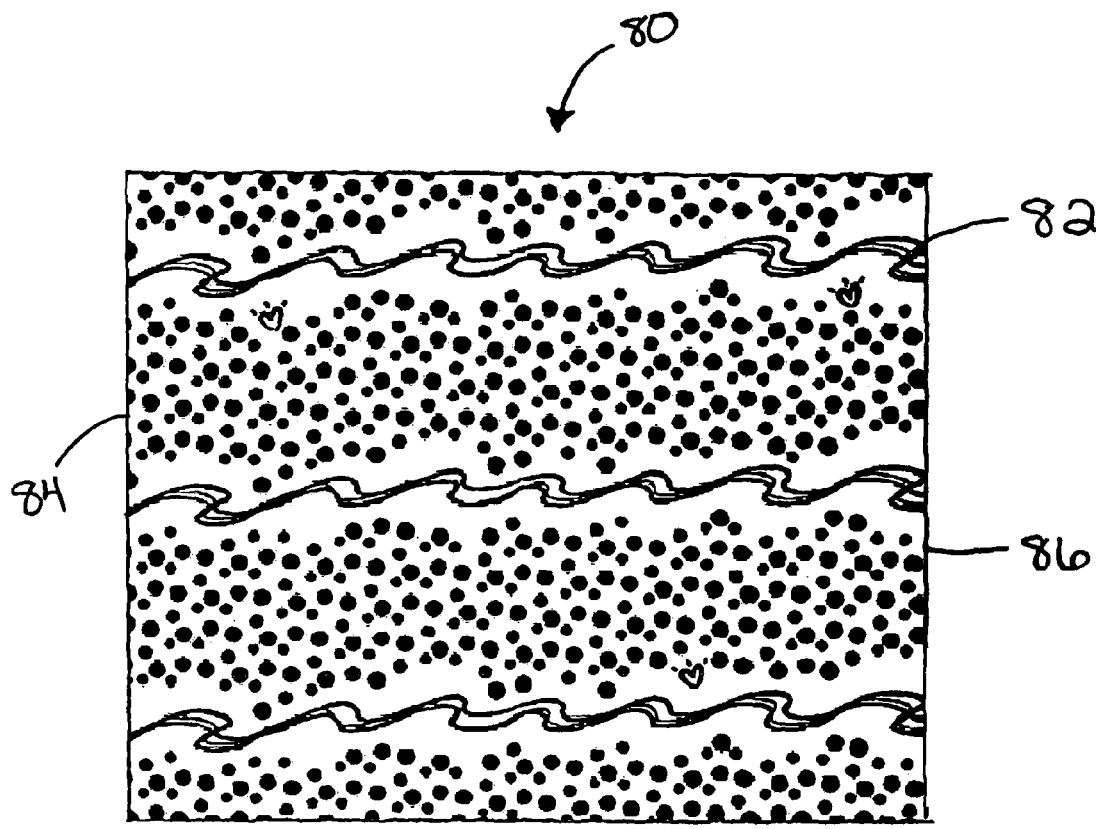
FIG. 8 is a plan view of an exemplary substrate made according to the process of the present invention.

FIG. 6 illustrates an idealized plan view of a substrate 72 made according to the present invention. As can be seen, a one-dimensional continuous molded element 70 may extend from one edge 71 of the substrate 72 to the opposite edge 73 of the substrate 72 in the Cross Direction. FIG. 7 illustrates an alternate exemplary one-dimensional continuous molded element 74 extending from one edge 75 of a substrate 76 to an opposite edge 77 of the substrate 76. FIG. 8 illustrates another alternate exemplary one-dimensional continuous molded element 82 extending from one edge 84 of a substrate 80 to an opposite edge 86 of the substrate 80.

Figure 9:
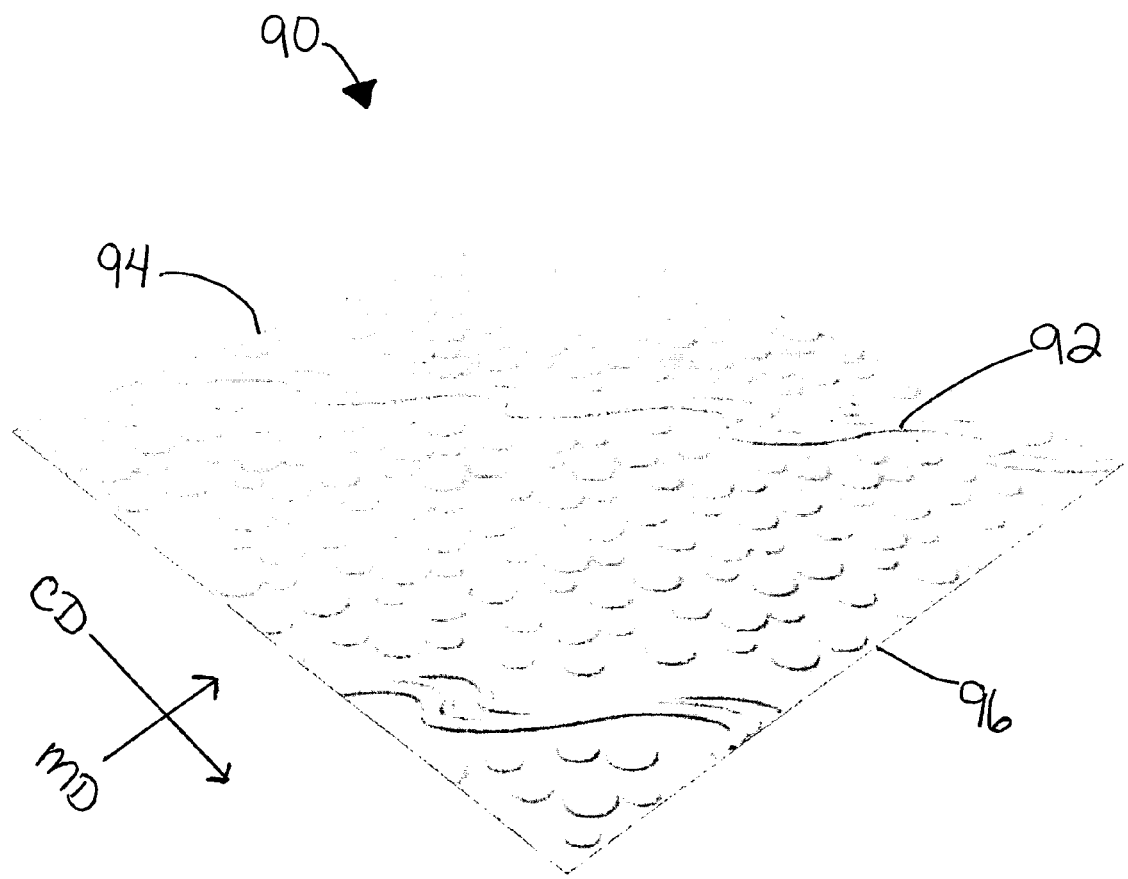
FIG. 9 is a plan view of an exemplary substrate made according to the process of the present invention.

FIG. 9 illustrates another idealized plan view of a substrate 90 made according to the present invention. As can be seen, a one-dimensional continuous molded element 92 may extend from one edge 94 of the substrate 90 to the opposite edge 96 of the substrate 90 in a non-Machine Direction. It should be noted that the substrate 90 has been rotated. The Machine Direction (MD) and the Cross Direction (CD) are noted for orientation purposes. During manufacture, in the conversion of a molded fibrous structure to a substrate, such as substrate 90, the resulting substrate need not have a molded element extending to exact opposite locations on the substrate. As the pattern on the molding element may extend at an angle as measured from the Cross Direction, the resulting molded element 92 on the substrate 90 may also extend at an angle as measured from the Cross Direction. Additionally, any manufacturing steps such as cutting, folding, interleaving, slitting, perforating, stacking, lotioning and combinations thereof, may shift the molded fibrous structure away from the exact Machine Direction such that the resulting substrate comprises a molded element extending as an angle as measured from the Cross Direction.

By molding the fibrous web, it can gain additional aesthetics, making the fibrous web particularly suitable and pleasing for use as a wipe. Moreover, besides better aesthetics, other beneficial physical characteristics may be imparted to the fibrous web by molding.

Molding a fibrous web may also have the effect of decreasing the tensile strength of the fibrous web. Generally, molding of a fibrous web is performed in a two-dimensional pattern. By "two-dimensional pattern" herein is meant a pattern that extends in at least two directions, such as the Machine Direction and the Cross Direction. A "two-dimensional pattern" may consist of discrete (i.e. non-continuous) molded elements or it may consist of continuous molded elements.

In the instance where the two-dimensional pattern comprises a continuous molded element, e.g. a molded element that is continuous from edge-to-edge across the length of the web and that is continuous from edge-to-edge across the width of the web (for example in both the Machine Direction and the Cross Direction), a high basis weight of the fibrous web may be required in order to ensure strength in both the Machine Direction and the Cross Direction.

A one-dimensional pattern may utilize a fibrous web with lower basis weight, thereby reducing material costs, and providing products of superior value. It has been discovered, however, that a one-dimensional molded element extending only in the Machine Direction results in a weakened molded fibrous structure relative to a one-dimensional molded pattern extending only in the Cross Direction. Without being bound by theory, it is believed that this weakening is a result of the preferential orientation of fibers, within the web, parallel to the Machine Direction, and the concomitant reduced number of fibers extending parallel to the Cross Direction of the fibrous structure.

It is believed that a molded element results from the displacement of fibers from the nonwoven fibrous structure. Such a displacement of such fibers results in a weakening of the fibrous structure in the vicinity of the molded element, as these fibers, so displaced, are no longer available to bond to adjacent fibers. In the instance where the molded element consists of discrete molded elements, the un-molded space surrounding each molded element helps to retain the overall strength of the fibrous structure, despite the molded elements. In the instance where the molded element comprises a continuous molded element, the displacement of fibers within the fibrous structure will be continuous across at least one dimension of the fibrous structure, and as such, maintaining the strength of the fibrous structure with a continuous molded element is a problem. To maintain the overall strength of the fibrous structure in the instance of a continuous molded element, it is important to provide a sufficient number of fibers within the fibrous structure with the capability to "span" the molded element, having a portion of the individual "spanning" fiber disposed on either side of the molded element. Such "spanning" fibers would, optimally, be disposed to be substantially perpendicular to the orientation of the continuous molded element.

One approach to ensuring a sufficient number of fibers oriented substantially perpendicular to the continuous molded element is to increase the total number of fibers within the fibrous structure, thereby increasing the number of fibers disposed in all orientations, thereby increasing the number of fibers that will be oriented so as to be substantially perpendicular to the continuous molded element. This approach, while effective, requires increasing the basis-weight of the fibrous structure, which requires an increased amount of material, and increased cost.

A preferred approach to maintaining web strength in the instance of a one-dimensional continuous molded element is to orient the direction of the molded element to be non-parallel to the dominant fiber-orientation direction within the web. As the Machine Direction is typically parallel to the dominant fiber orientation direction, this amounts to orienting the direction of the continuous one-dimensional molded element to be non-parallel to the Machine Direction. It can be appreciated by one of ordinary skill in the art that the web strength will increase, accordingly, as the one-dimensional continuous molded element becomes increasingly oriented in the Cross Direction, and decreasingly oriented in the Machine Direction.

Molding in the Cross Direction may result in higher tensile strength and modulus of the fibrous structure. This may be demonstrated in the table below in which two different molding patterns are arranged in the Machine Direction and again in the Cross Direction. Thus, Pattern #1 is oriented in the Machine Direction on a molding member. Pattern #1 is also oriented in the Cross Direction on a separate molding member. The same may be done for Pattern #2. An increase in both the tensile strength and the modulus may be demonstrated when the patterns are oriented in the Cross Direction as opposed to the Machine Direction.

TABLE 1

| Molded Element Orientation | Pattern #1 | | Pattern #2 | |
|---|---|---|---|---|
| | MD | CD | MD | CD |
| MD Tensile Strength (N) | 84 | 96 | 88 | 97 |
| MD Initial Slope/Modulus (N/m) | 3108 | 4042 | 3248 | 3880 |
| CD Tensile Strength (N) | 20 | 25 | 20 | 25 |
| CD Initial Slope/Modulus (N/m) | 36 | 47 | 45 | 46 |

Tensile strength may be measured using EDANA method 20.2-89 in both the cross direction and machine direction. The Modulus may be taken as the initial slope of the tensile curve per the same EDANE method.

The degree to which the orientation of the continuous one-dimensional molded element being non-parallel to the Machine Direction contributes to the strength of the resulting web also depends on the degree to which the fibers in the nonwoven fibrous structure are preferentially oriented in the Machine Direction. To the extent to which the fiber orientation with the nonwoven fibrous structure is purely homogeneous, the benefit to the strength of the fibrous structure derived from orienting the one-dimensional continuous molded element to be non-parallel to the Machine Direction is lost. Said another way, in a nonwoven fibrous structure in which the fiber orientation is purely homogeneous, the fibrous structure strength would be un-effected by the orientation of the continuous one-dimensional molded element. However, to the extent that the fiber orientation is heterogeneous (typically, preferentially oriented to be parallel to the Machine Direction), imparting the one-dimensional molded element in an orientation that is non-parallel to the Machine Direction becomes important.

A number of means of determining fiber orientation heterogeneity are known. In one such typical method, a fibrous nonwoven structure is examined under a microscope, and the number of fibers oriented at different angles relative to the Cross Direction (taken as angle=0°, and then again angle=180°) are counted via grey scale discrimination, such as may be detected by an automated software that may identify and verify the presence of fibers. Typically the number of fibers orientated in each direction are grouped into "bins" of 10-degree increments, and the final result is reported as a per-cent of the total fibers counted which reside in each bin.

Below is a representation of fiber orientation for a hydroentangled fibrous structure.

TABLE 2

| Bin Range (degrees) | Mean (% of fibers) |
|---|---|
| 0-10 | 4.4 |
| 10-20 | 4.8 |
| 20-30 | 5.1 |
| 30-40 | 5.0 |
| 40-50 | 5.1 |
| 50-60 | 5.5 |
| 60-70 | 6.2 |
| 70-80 | 6.6 |
| 80-90 | 7.3 |
| 90-100 | 7.5 |
| 100-110 | 6.8 |
| 110-120 | 6.2 |
| 120-130 | 5.5 |
| 130-140 | 4.9 |
| 140-150 | 4.8 |

TABLE 2-continued

| Bin Range (degrees) | Mean (% of fibers) |
|---|---|
| 150-160 | 4.6 |
| 160-170 | 4.8 |
| 170-180 | 5.0 |
| Total Percent | 100.0 |

From these data, it is possible to calculate the net heterogeneity of the fiber orientation within the fibrous nonwoven structure. Specifically, the net fiber orientation in the Machine Direction (FOMD) would be taken as:

$$FOMD = \sum_{n=1}^{nB} \mathrm{Sin}[(n-0.5) \times B] \times \% \ B_n$$

While the net fiber orientation in the Cross Direction (FOCD) would be taken as:

$$FOCD = \sum_{n=1}^{nB} \mathrm{Cos}[(n-0.5) \times B] \times \% \ B_n$$

where:
nB=Number of Bins
B=Bin Size
% Bn=% of fibers in Bin number n

The net heterogeneity of fiber orientation within the fibrous nonwoven structure would, then, be characterized as the ratio of the FOMD to the FOCD.

Net Fiber Orientation=FOMD/FOCD

Note that a fibrous nonwoven structure with a purely homogeneous fiber orientation would have a Net Fiber Orientation of 1, indicating equal net fiber orientation in the Machine and Cross Directions. A Net Fiber Orientation of greater than 1.0 would indicate a heterogeneous fiber orientation, with a net preferential orientation in the Machine Direction. A Net Fiber Orientation of less than 1.0 would indicate a heterogeneous fiber orientation, with a net preferential orientation in the Cross Direction. It can be appreciated by one of ordinary skill in the art that the theory regarding the need to orient the continuous one-dimensional molded element to be non-parallel to the Machine Direction for a fibrous web in which the Net Fiber Orientation is greater than 1.0 would equally apply to the need to orient the one-dimensional continuous molded element to be non-parallel to the Cross Direction for a fibrous web in which the Net Fiber Orientation is less than 1.0.

A web for which it is important to orient a one-dimensional molded element in non-parallel direction to the Machine Direction may have a Net Fiber Orientation of greater than about 1.0, more preferably greater than about 1.1 and even more preferably greater than about 1.3. The hydroentangled fibrous structure represented in Table 2 above has a net fiber orientation of 1.16.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for making a molded fibrous structure comprising a continuous molded element comprising the steps of:
   a. conveying a fibrous web having a dominant fiber orientation direction in an x-y plane along a machine direction over a molding member, wherein said molding member comprises a pattern of raised areas, lowered areas, or combinations thereof,
   b. directing fluid to impact said fibrous web, wherein said fibrous web conforms in correspondence with said pattern to form said molded fibrous structure, and
   wherein a portion of said pattern is oriented non-parallel to the dominant fiber orientation direction within the fibrous web in the x-y plane, and wherein said fibrous web comprises molded fields formed from said pattern and unmolded fields, each of said fields generally extending non-parallel to the dominant fiber orientation direction within the fibrous web in the x-y plane and wherein the fibrous web has a basis weight of less than about 75 gsm.

2. The method of claim 1 wherein at least a portion of said pattern is oriented from about 85 degrees to about −85 degrees from a Cross Direction.

3. The method of claim 2 wherein at least a portion of said pattern is oriented from about 45 degrees to about −45 degrees from the Cross Direction.

4. The method of claim 1 wherein said continuous molded element is one-dimensional.

5. The method of claim 1 wherein said fibrous web has a net fiber orientation of greater than zero.

6. The method of claim 5 wherein said fibrous web has a net fiber orientation of greater than 1.1.

7. The method of claim 1 wherein said fluid impacts said fibrous web in a non-continuous flow.

8. The method of claim 1 wherein said fluid impacts said fibrous web in a continuous flow.

9. The method of claim 1 wherein said pattern comprises a width.

10. The method of claim 9 wherein said width of said pattern is from about 0.03 cm to about 4.5 cm.

11. The method of claim 1 further comprising a step of converting said molded fibrous structure into a substrate.

12. The method of claim 1 wherein said fibrous web comprises synthetic fibers, natural fibers or combinations thereof.

* * * * *

UNITED STATES PATENT AND TRADEMARK OFFICE
CERTIFICATE OF CORRECTION

| | | |
|---|---|---|
| PATENT NO. | : 7,771,648 B2 | Page 1 of 1 |
| APPLICATION NO. | : 11/398958 | |
| DATED | : August 10, 2010 | |
| INVENTOR(S) | : Sheehan et al. | |

It is certified that error appears in the above-identified patent and that said Letters Patent is hereby corrected as shown below:

Column 5

Line 41, after the word thereof insert a --.--.

Column 14

Line 22, delete "Synrise" and insert --Symrise--.

Signed and Sealed this
Thirtieth Day of October, 2012

David J. Kappos
*Director of the United States Patent and Trademark Office*